United States Patent Office 3,496,416
Patented Feb. 17, 1970

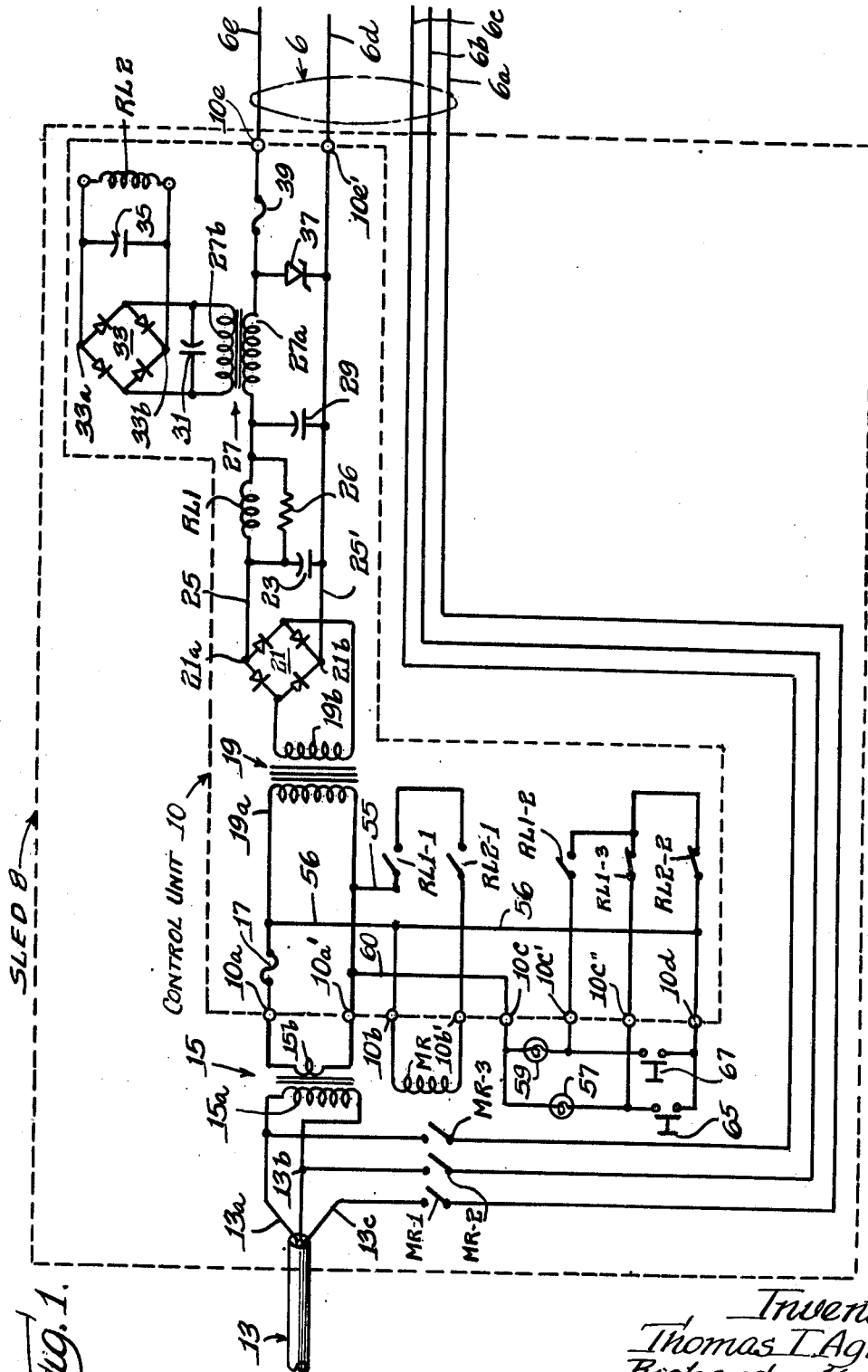

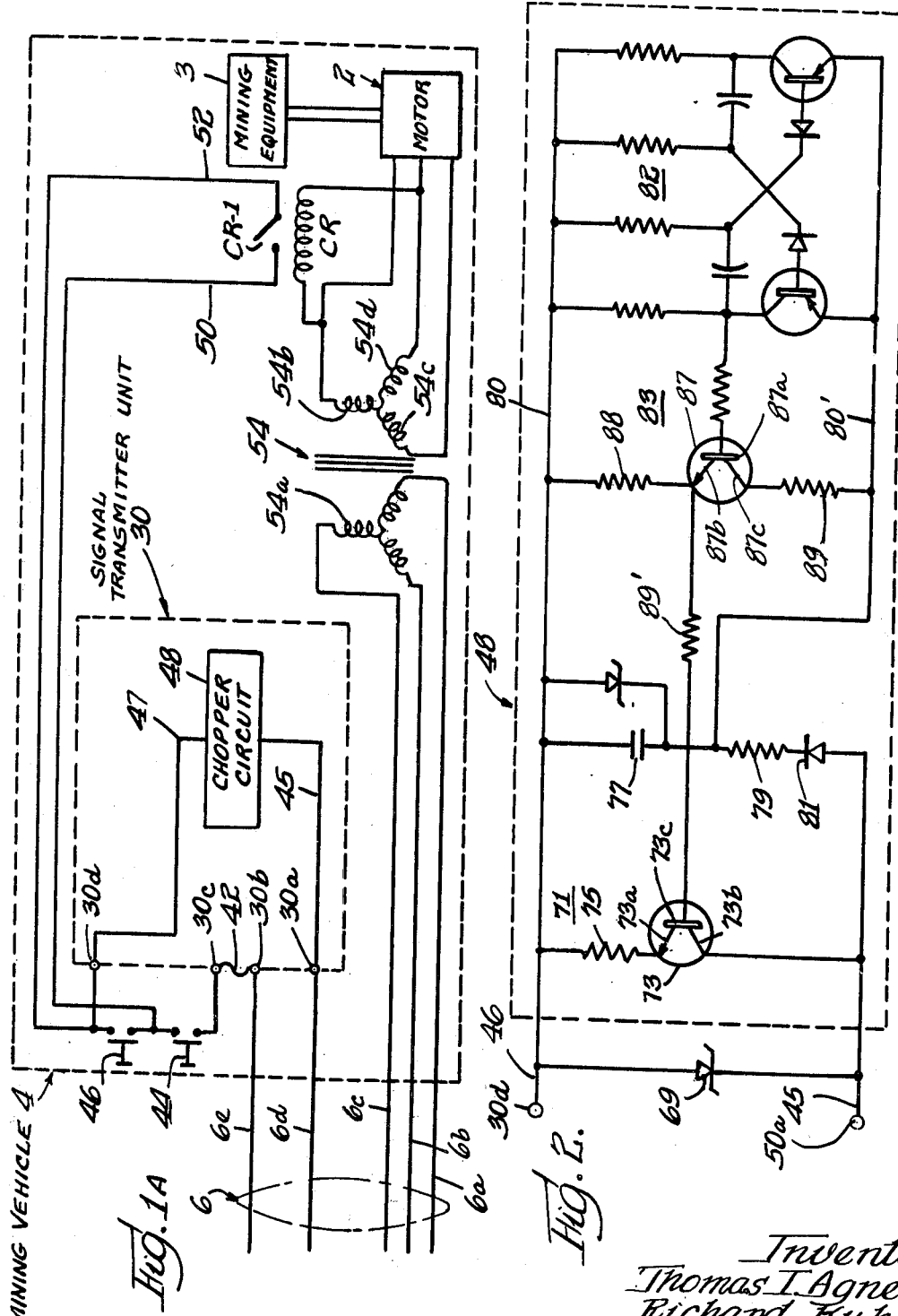

3,496,416
CABLE FAULT MONITORING SYSTEM
Thomas I. Agnew, Irwin, and Richard Kuhn, Pittsburgh, Pa., assignors, by mesne assignments, to Gulton Industries, Inc., Metuchen, N.J., a corporation of Delaware
Filed Jan. 4, 1968, Ser. No. 695,704
Int. Cl. H02h 1/02, 7/00; G08b 21/00
U.S. Cl. 317—18                      15 Claims

ABSTRACT OF THE DISCLOSURE

In a system which delivers electrical power to electric equipment on a vehicle through power conductors in a cable extending to the equipment from a remote point, cable monitoring apparatus comprising a pair of monitoring conductors in said cable, a source of steady D.C. coupled to said pair of monitoring conductors at said remote point, a signal transmitter on said vehicle which signal transmitter is coupled to said monitoring conductors to be energized by said source of steady D.C. when there is continuity in said monitoring conductors to transmit a pulsating signal on said pair of monitoring conductors to said remote point, D.C. sensing means at said remote point for sensing the flow of a steady D.C. current from said source of D.C. to the input portion of said monitoring conductors, variable signal sensing means at said remote point for selectively sensing the presence of said pulsating signal generated by said signal transmitter, and control means responsive to said steady D.C. and pulsating signal sensing means for permitting power to flow to said electric equipment only if there is flow of D.C. current in said D.C. sensing means and flow of the transmitter pulsating signal in said variable signal sensing means.

---

This invention relates to a cable monitoring system and has its most important, but not its only, application to a system for monitoring power cables extending to a vehicle (i.e. a movable frame) carrying mining equipment to be sometimes referred to as a mining vehicle.

The mining equipment on the mining vehicle which severs the mineral from the face of an underground mine is very commonly driven by one or more three phase electric motors which are supplied with electric power through power conductors in a cable trailing behind the vehicle. The power conductors of the cable commonly carry three phase, high voltage, alternating current (A.C.) which is stepped down to a lower voltage by a transformer on the mining vehicle. The cable extends to a remote point which may be 500 to 5000 ft. or more from the mining vehicle where it terminates on another vehicle, referred to as a sled, which carries equipment which is most advantageously spaced a long distance from the face of the mine to minimize explosion hazards. It is apparent that there is a danger that the cable can be damaged to cause an open or short circuit in the conductors of the cable which would cause arcing of the high voltage conductors and thereby cause a serious explosion hazard.

To minimize the possibility that a damaged cable will cause arcing of the high voltage conductors, it has been proposed to incorporate in the cable a pair of monitoring conductors or one monitoring conductor with an external ground return which carry a relatively small current and voltage, and extend to manually operable start and stop switches located on the mining vehicle. When the manually operable start switch is operated, a small current is caused to flow from the sled through the monitoring conductors of the cable to the mining vehicle when these conductors are not short or open circuited. (When reference is made to a pair of monitoring conductors in the claims, such wording is intended to cover the obvious equivalent thereof where one cable monitoring conductor is replaced by an external ground return.) Relays or other current sensing means may be provided which respond to the flow of current in the monitoring conductors of the cable by closing switches which allow the aforementioned three phase high voltage power to flow to the mining equipment only if there is continuity in the cable. However, these cable monitoring systems proposed prior to the present invention were relatively sensitive to wide variations in cable length and, if a short circuited or open circuit occurred in the cable, no indication was given to the operator whether defect in the cable was a short or open circuit condition.

It is one of the objects of the invention to provide a cable monitoring system similar to that described above which is relatively insensitive to wide variations in cable length, such as length variations in the order of from 500 to 5000 ft. A related object of the invention is to provide a monitoring system as described in which cable fault indications are given which inform the operator whether a defect in the monitoring conductors in the cable is due to an open or short circuit condition.

In accordance with the most preferred form of the invention, the aforementioned monitoring conductors in the cable carry direct current (D.C.) to a signal transmitter, which is preferably a D.C. chopper circuit, located on the mining vehicle. When a manually operable start switch on the mining vehicle is operated, the voltage on the monitoring conductors is connected to the signal transmitter to energize the same if there is continuity in the monitoring conductors. In such case, the signal transmitter will transmit a signal to the sled through the same monitoring conductors which carried energizing current to the signal transmitter. A D.C. sensing device on the sled, such as a D.C. relay, is connected in series with one of the monitoring conductors, and a pulsating signal sensing device, such as the primary winding of a transformer, is placed in series between the D.C. sensing device and the input to the cable, so that the presence of a pulsating signal fed through the monitoring conductors from the signal transmitter will induce a voltage in the secondary winding of the transformer. The D.C. relay is isolated from the pulsating signal by a filter and the transformer secondary winding is non-responsive to the flow of a steady D.C. current in the primary winding since only a change in current in the primary winding can induce a voltage in the secondary winding. A relay or other voltage responsive device is connected across the secondary winding of the transformer.

Energization of the D.C. relay will indicate the absence of any open circuits in the monitoring conductors and the energization of the relay coupled to the secondary winding of the aforementioned transformer indicates the absence of any short circuit in the monitoring conductors. Means for controlling the flow of high voltage power through the power conductors in the cable is provided which allows such power to flow only when the D.C. and pulsating signal sensing means indicate that the monitoring conditions are not open or short circuited. An annunciator apparatus is also provided which is responsive to the D.C. and pulsating signal sensing means for indicating automatically whether a fault in the cable is due to an open or short circuiting of the monitoring conductors.

The above and other objects, advantages and features of the invention will become apparent upon making reference to the specification to follow, the claims and the drawings wherein:

FIGS. 1 and 1A together is a circuit diagram of the preferred cable monitoring system of the invention; and FIG. 2 is a preferred circuit for the signal transmitter showing in block form in FIG. 1.

Refer now more particularly to FIGS. 1 and 1A which illustrate the invention applied to a system for supplying power to one or more electrical motors 2 (FIG. 1A) which drive mining equipment 3 located on a vehicle represented by the dashed box 4 and to be referred to as a mining vehicle. Trailing rearwardly from the vehicle 4 is a cable generally indicated by reference numeral 6, the cable having at least three, high voltage, three phase A.C. power conductors 6a, 6b and 6c and a pair of monitoring conductors 6d and 6e. The cable 6 extends to a vehicle or sled generally indicated by a dashed box identified by reference numeral 8 (FIG. 1). The sled 8 carries a control unit generally indicated by a dashed box 10. In its most preferred commercial form, all of the components forming the control unit 10 are supported within a housing having a series of terminals 10a–10a', 10b–10b', 10c–10c'–10c'', 10d and 10e–10e'.

Extending to the sled 8 is a high voltage cable 13 having three conductors 13a, 13b and 13c respectively carrying a high voltage, three phase A.C. voltage, which, for example, may be many thousands of volts, like 4000 volts. Two of the conductors 13a and 13b extend to the opposite ends of the primary winding 15a of a step-down transformer 15 whose secondary winding 15b is coupled across the terminals 10a–10a' of the control unit 10. The transformer 15, may, for example, step the voltage down to about 120 volts so the terminals 10a–10a' are a source of commercial power line voltage to operate various electrical devices on the sled 8. A fuse 17 is connected between the terminal 10a and one end of the primary winding 19a of another step-down transformer 19 having a secondary winding 19b across which, for example, a voltage in the neighborhood of 40 to 50 appears.

The secondary winding 19b is coupled to the input of a full wave rectifier circuit 21 which provides at output terminals 21a–21b respectively a D.C. voltage where the terminal 21a is negative with respect to the terminal 21b. A filter capacitor 23 is coupled across the terminals 21a–21b to provide a relatively steady D.C. voltage across a pair of control circuit input conductors 25–25'. A D.C. relay coil RL1 shunted by a resistor 26 is connected between the conductor 25 and the primary winding 27a of a transformer 27. A filter capacitor 29 is coupled between the juncture of the relay coil RL1 and the primary winding 27a and the input conductor 25' which constitutes a common positive conductor for the control circuit being described. In a manner to be described, a pulsating current from a signal transmitter unit 30 on the mining vehicle 4 (FIG. 1A) is, when there is continuity through the monitoring conductors 6d–6e, caused to pass through the primary winding 27a of the transformer 27 to induce an A.C. voltage in the secondary winding 27b of the transformer 27. A capacitor 31 may be coupled across the secondary winding 27b and the transformer secondary winding 27b is coupled to the input of a full wave rectifier circuit 33 which rectifies the applied voltage A.C. to provide a D.C. voltage at the output terminals 33a–33b thereof. A D.C. relay coil RL2 is coupled across the terminals 33a–33b and a filter capacitor 35 is connected across the terminals of relay RL2. The transformer 27 and the associated circuitry is a pulsating signal sensing means which senses the presence of a pulsating signal from the signal transmitter 30 and is insensitive to a steady D.C.

A Zener diode 37 is connected between the output side of the primary winding 27a and the common positive conductor 25'. The Zener diode 37 is arranged to break down when an abnormally high voltage appears in the circuit, such as 60 volts in the exemplary circuit being described. A fuse 39 is coupled between the output side of the primary winding 27a and the output terminal 10e. The common positive conductor 25' is connected to the other output terminals 10e'.

The monitoring conductors 6d and 6e of the cable 6 are coupled between the control unit output terminals 10e–10e' and a pair of input terminals 30a–30b of the signal transmitter unit 30 mounted on the mining vehicle 4 (FIG. 1A). As previously indicated, the cable 6 may vary in length in mining applications from as little as 500 ft. to as much as 5000 ft. and longer.

The illustrated signal transmitter unit 30 also has a terminal 30c, and a fuse 42 is coupled between the terminals 30b and 30c. A normally closed pushbutton switch 44 is connected between the terminal 30c and a normally-open pushbutton switch 46 which is connected to a terminal 30d of the signal transmitter unit 30. A pair of conductors 45–47 are connected between the signal transmitter unit terminals 30a and 30b and the input of a D.C. chopper circuit 48 which, when energized by D.C. fed thereto through the aforementioned monitoring conductors 6d–6e will generate a pulsating current which will be fed back to the same circuit which energized the chopper circuit through the monitoring conductors 6d–6e to cause a pulsating current to flow through the primary winding 27a of transformer 27.

When the normally open pushbutton switch 46 is momentarily depressed, the D.C. output of the aforementioned full wave rectifier circuit 21 is coupled to the chopper circuit 48 if the cable 6 is not short or open circuited. Thus, if the monitoring conductor 6d or 6e is open circuited, no D.C. energizing voltage will be fed to the chopper circuit 48 and no current will flow through the relays RL1 or RL2. Also, if the cable monitoring conductors 6d–6c are short circuited, the chopper circuit 48 will not receive any energizing voltage, although D.C. current will continue to flow through the D.C. relay coil RL1. If, on the other hand, the chopper circuit 48 receives energizing voltage from the rectifier bridge circuit 21, then a pulsating current will flow through the primary coil 27a of the control unit 10 to energize the relay RL2 coupled to the output of the bridge circuit 33.

When the cable 6 is not defective, the momentary closure of the normally open pushbutton switch 46, in addition to energizing the chopper circuit 48, will effect energization of a relay CR on the mining vehicle 4 to close a pair of normally-open holding contacts CR–1 coupled by a pair of conductors 50–52, in parallel with the pushbutton switch 46, to lock-in the energizing circuit for the chopper circuit 48. The chopper circuit can be de-energized by momentarily opening the normally-closed pushbutton switch 44.

Relay coil CR, as illustrated, is coupled to the secondary winding 54b of a three phase transformer 54 whose primary windings 54a are respectively connected to the three phase, high voltage conductors 6a, 6b and 6c of the cable 6. The various secondary windings 54b, 54c and 54d of the transformer 54 are respectively coupled to the three phase motor 2. The high voltage conductors 6a, 6b and 6c are connected respectively in series with normally open contacts MR–1, MR–2 and MR–3 of a relay coil MR (FIG. 1) mounted on the sled 8. The contacts MR–1, MR–2 and MR–3 are respectively connected to the high voltage conductors in the input cable 13. The relay coil MR in the illustrated embodiment of the invention is coupled across terminals 10b–10b' of the control unit 10. Normally open contacts RL1–1 and RL2–1 of the relays RL1 and RL2 are connected in series between a conductor 55 coupled to the control unit A.C. power input terminal 10a' and control unit terminal 10b', and a conductor 56 connects control unit terminal 10b to the control unit power input terminal 10a so that the relay coil MR will become energized when the relays RL1 and RL2 are energized indicating that cable 6 is in good operating condition. If the cable 6 is opened or short circuited, then either or both contacts RL1–1 and RL2-1 will remain open to keep relay coil MR de-energized and prevent energization of the motor 2 and the relay CR. When the operator pushes normally closed pushbutton switch 44, relays RL1 and RL2 will become de-energized to shut-down the entire system.

When there is an open or short circuit in the monitoring conductor 6d and 6e, an annunciator circuit is provided for indicating whether an open or short circuit condition is present. This annunciator circuit includes an open circuit indicating lamp 57 and a short circuit indicating lamp 59. The open circuit indicating lamp 57 is connected between the control unit terminals 10c-10c" and the short circuit indicating lamp 59 is connected across the control unit terminals 10c-10c'. A conductor 60 connects terminal 10c to the power input terminal 10a. A set of normally open contacts RL1-2 of the relay RL and a set of normally closed contacts RL2-2 of relay RL2 are connected in series between the control unit terminal 10c' and the conductor 56 coupled to the power input terminal 10a. Thus, if the relay RL1 is energized and relay RL2 is de-energized indicating an open circuit condition of the monitoring conductor 6d and 6e, the open circuit indicating lamp will be energized through a circuit including the conductor 60, the short circuit indicating lamp 59, contacts RL1-2 and RL2-2 and conductor 56.

Contacts RL1-3 of the relay RL1 are connected between the control unit terminal 10c" and the juncture between the contacts RL1-2 and RL2-2. Accordingly, when an open circuit is present in a monitoring conductor 6d or 6e, the resulting de-energization of the relays RL1 and RL2 will complete an energization circuit for open circuit indicating lamp 57 comprised by the conductor 60, the open circuit indicating lamp 57, contacts RL1-3 and RL2-2 and conductor 56.

To test the operation of the lamps 57 and 59, normally open pushbutton switches 65 and 67 are respectively connected between the terminal pairs 10c"-10d and 10c'-10d. Depression of the pushbutton button 65 will energize the lamp 57 if it is operating properly and the depression of the pushbutton switch 67 will energize the lamp 59 if it is operating properly.

Refer now to FIG. 2 which illustrates the preferred exemplary circuit for the chopper circuit 48. Thus, as there shown, a Zener diode 69 is coupled across the signal transmitter unit 30 so that an excess of voltage on the monitoring conductors 6d-6e will breakdown the Zener diode 69. It will be assumed that the chopper circuit 48 is designed to operate over the range of applied D.C. voltage resulting from the wide variations in the lengths of the monitoring conductors 6d-6e. Part of the D.C. voltage appearing across the full wave rectifier circuit 21 will be dropped across the parallel circuit of the coil RL1 and resistor 26, the monitoring conductors 6d-6e and the effective load impedance on the conductors 6d-6e applied by the chopper circuit 48. The chopper circuit 48 includes a solid state switch 71 connected across the input conductors 45 and 46. As illustrated, the switch unit comprises a PNP transistor 73 whose emitter electrode 73a is coupled through a resistor 75 to the conductor 46 and whose collector electrode 73b is coupled to the conductor 45. A series circuit comprising a capacitor 77, a resistor 79 and a rectifier 81 are respectively connected between the input conductors 45 and 46 so that the capacitor 77 will charge through the resistor 79 and the rectifier 81 to provide a D.C. voltage to energize an oscillator circuit 82 even when the conductors 45 and 46 are momentarily interconnected through transistor 73 when the transistor is driven into a conductive state. The oscillator circuit 82 comprises a more or less conventional multivibrator circuit coupled by conductors 80 and 80' across capacitor 77. The oscillator circuit 82 drives a transistor amplifier circuit 83 which includes a NPN transistor 87 whose base electrode 87a is driven by the output of the oscillator circuit 82 alternately to render the transistor 87 conductive and non-conductive. The emitter electrode 87b of the transistor 87 is coupled through a resistor 88 to the conductor 80, and the collector electrode 87c of the transistor 87 is coupled through a resistor 89 to the conductor 80'. The emitter electrode 87b is coupled through a resistor 89' to the base electrode 73c of the switch transistor 73. As the oscillator circuit 82 alternately renders the NPN transistor 87 alternately conductive and non-conductive, the switch transistor 73 is likewise rendered conductive and non-conductive.

It is thus apparent that the present invention provides a monitoring and/or annunciator system which responds to the condition of the cable 6 by allowing the feeding of voltage to the mining equipment through the high voltage conductors of the cable 6 only when the monitoring conductors of the cable are not open or short circuited. Also, in case of an open or short circuit in the monitoring conductors, lamps 57 and 59 indicate whether an open or short circuit condition exists. Moreover, the monitoring system just described is relatively insensitive to the length of the cable 6, thereby increasing the reliability and utility of the equipment. It should also be appreciated that the control unit 10 and the signal transmitter unit 30 may be standardized units usable in a wide variety of systems having various cable lengths and related equipment which are connected to the various terminals described.

It should be understood that numerous modifications may be made in the most preferred form of the invention descrbed above without deviating from the broader aspects thereof.

We claim:

1. In a system which delivers electrical power to an electric equipment carrying vehicle through power conductor means in a cable extending to the vehicle from a remote point, which cable can be damaged causing a short or open circuited cable, a monitoring apparatus for indicating and distinguishing between an open and short circuited cable, said monitoring apparatus comprising: monitoring conductor means in said cable, a source of energizing current coupled to said monitoring conductor means at said remote point, a signal transmitter on said vehicle which signal transmitter is coupled to said monitoring conductor means to be energized by said source of energizing current when there is continuity in said monitoring conductor means to transmit a signal on said monitoring conductor means to said remote point which signal is distinguishable from current flowing through the input portion of said monitoring conductor means from said source of energizing current, first condition sensing means at said remote point for sensing the flow of current from said source of energizing current to the input portion of said monitoring conductor means, second condition sensing means at said remote point for selectively sensing the presence of said distinguishable signal generated by said signal transmitter, and control means responsive to said first and second condition sensing means for providing a short circuit indication when said first and second condition sensing means indicates the presence of the flow of energizing current to the input portion of said monitoring conductor means and the absence of said distinguishable signal at said remote point.

2. The system of claim 1 wherein said control means includes means for providing an open circuit indication when said first condition sensing means indicates the absence of current flow from said source of energizing current.

3. The system of claim 1 wherein said monitoring conductor means are a pair of conductive paths which carry both the current for energizing said signal transmitter and for carrying said distinguishable signal generated by said signal transmitter.

4. The system of claim 3 wherein the energizing current from said source of energizing current is a steady D.C. which passes through said first condition sensing means which is a D.C. sensing means, said signal transmitted by said signal transmitter is a pulsating signal and said second condition sensing means is a pulsating current sensing means.

5. The system of claim 4 wherein said pulsating current sensing means includes a transformer with a primary winding through which said steady direct current from said source of energizing current and said pulsating transmitted signal pass and a secondary winding across which appears a voltage induced thereon by said pulsating signal, and means responsive to said induced voltage.

6. The system of claim 1 wherein said vehicle is a mining vehicle, said cable is one which trails on the mine floor behind the vehicle for a substantial distance, and said first and second condition sensing means and said control means being carried on a second vehicle located at said remote point.

7. The system of claim 6 wherein the power conductors of said cable carry a voltage of many thousands of volts, and said monitoring conductor means carry a relatively low voltage and current.

8. In a system which delivers electrical power to an electric equipment carrying vehicle through power conductor means in a cable extending to the vehicle from a remote point, which cable can be damaged causing a short or open circuited cable, monitoring apparatus for allowing power to flow through said power conductor means to said equipment only when the cable is not short or open circuited, said monitoring apparatus comprising: monitoring conductor means in said cable, a source of energizing current coupled to said monitoring conductor means at said remote point, a signal transmitter on said vehicle which signal transmitter is coupled to said monitoring conductor means to be energized by said source of energizing current when there is continuity in said monitoring conductor means to transmit a signal on said monitoring conductor means to said remote point which signal is distinguishable from current flowing through the input portion of said monitoring conductor means from said source of energizing current, first condition sensing means at said remote point for sensing the flow of current from said source of energizing current to the input portion of said monitoring conductor means, second condition sensing means at said remote point for selectively sensing the presence of said distinguishable signal generated by said signal transmitter, and control means responsive to said first and second condition sensing means for preventing the coupling of power to said vehicle through said power conductor means when said first condition sensing means indicates that no energizing current is flowing through the input portions of said monitoring conductor means, for preventing the coupling of power to said vehicle through said power conductor means when said second condition sensing means indicates the absence of said distinguishable signal at said remote point and for effecting the transfer of power to said vehicle through said power conductor means when said second condition sensing means indicates the presence of said distinguishable signal at said remote point.

9. The system of claim 8 wherein said monitoring conductor means are a pair of conductors which carry both the current for energizing said signal transmitter and for carrying said distinguishable signal generated by said signal transmitter.

10. The system of claim 9 wherein the energizing current from said source of energizing current is a steady D.C. which passes through said first condition sensing means which is a D.C. sensing means, said signal transmitted by said signal transmitter is a pulsating signal and said second condition sensing means is a pulsating current sensing means.

11. The system of claim 10 wherein said pulsating current sensing means includes a transformer with a primary winding through which said steady direct current from said source of energizing current and said pulsating transmitted signal pass and a secondary winding across which appears a voltage induced thereon by said pulsating signal, and means responsive to said induced voltage.

12. The system of claim 8 wherein there is provided on said electric equipment carrying vehicle a manually operable start switch which normally disconnects the source of energizing current from said signal transmitter and, when operated, connects said source of energizing current thereto, means for maintaining the coupling of said source of energizing current to said signal transmitter when said start switch is initially operated, and a manually operable stop switch for momentarily stopping the flow of energizing current to said signal transmitter to deenergize the entire system.

13. In a system which delivers electrical power to electric equipment through power conductors in a cable extending to the equipment from a remote point, cable monitoring apparatus comprising a pair of monitoring conductors in said cable, a steady source of D.C. energizing current coupled to said pair of monitoring conductors at said remote point, a signal transmitter on said vehicle which signal transmitter is coupled to said monitoring conductors to be energized by said source of energizing current when there is continuity in said monitoring conductors to transmit a pulsating current on said pair of monitoring conductors to said remote point, D.C. sensing means at said remote point for sensing the flow of a steady D.C. current from said source of energizing current to the input portion of said monitoring conductors, variable current sensing means at said remote point for selectively sensing the presence of said pulsating current generated by said signal transmitter, and control means responsive to the sensing by said D.C. and variable current sensing means of the absence of D.C. current in said D.C. sensing means or the presence of current in said D.C. sensing means and the absence of a pulsating current in said variable current sensing means.

14. The system of claim 13 wherein said D.C. sensing means is coupled in series with one of said pairs of monitoring conductors so current from said source of energizing current passes therethrough, there is provided filter means coupled to said D.C. current sensing means for isolating said D.C. current sensing means from said pulsating current fed through said pair of monitoring conductors from said signal transmitter, and said variable current sensing means includes a portion connected in series with one of said monitoring conductors.

15. The system of claim 13 wherein said signal transmitter includes an oscillator, electrical energy storage means coupled between said pair of monitoring conductors and said oscillator for storing energy to energize the oscillator even when the pair of monitoring conductors are momentarily short circuited, and normally open switch means coupled across said monitoring conductors which switch means is open and closed by and upon the energization of said oscillator, thereby to periodically short circuit said pair of conductors monitoring to produce a pulsating current in said monitoring conductors.

References Cited
UNITED STATES PATENTS 3,196,316  7/1965  Crom _____ 317—18
3,335,324  8/1967  Buckeridge _____ 317—18

LEE T. HIX, Primary Examiner

J. D. TRAMMELL, Assistant Examiner

U.S. Cl. X.R.

317—33, 45; 340—256